United States Patent
Wiegand et al.

(10) Patent No.: US 9,067,453 B2
(45) Date of Patent: Jun. 30, 2015

(54) BOOK PRODUCTION SYSTEM, METHOD AND PROGRAM STORAGE MEDIUM

(75) Inventors: Michael A. Wiegand, Webster, NY (US); Albert L. O'Neil, III, Rochester, NY (US); Brian Wilson, Marion, NY (US)

(73) Assignee: Xerox Corporation, Norwalk, CT (US)

( * ) Notice: Subject to any disclaimer, the term of this patent is extended or adjusted under 35 U.S.C. 154(b) by 326 days.

(21) Appl. No.: 13/410,334

(22) Filed: Mar. 2, 2012

(65) Prior Publication Data
US 2013/0230367 A1    Sep. 5, 2013

(51) Int. Cl.
| | |
|---|---|
| G06F 3/12 | (2006.01) |
| G06K 15/00 | (2006.01) |
| H04N 1/00 | (2006.01) |
| B42C 9/00 | (2006.01) |
| B42C 11/00 | (2006.01) |
| B42C 7/00 | (2006.01) |
| B42C 19/00 | (2006.01) |
| B42C 11/04 | (2006.01) |

(52) U.S. Cl.
CPC .............. B42C 19/00 (2013.01); B42C 11/04 (2013.01); *B42P 2261/04* (2013.01); G06K 15/00 (2013.01); G06F 3/1208 (2013.01); G06F 3/1244 (2013.01); G06F 3/1285 (2013.01)

(58) Field of Classification Search
CPC ........................................................ B42C 11/00
USPC ........... 358/1.2, 1.4, 1.9, 2.1, 1.13, 1.18, 501, 358/448, 449, 462, 1.12; 399/361, 401, 399/107, 408, 362, 381, 389, 407; 412/1, 4, 412/8, 9, 11, 18, 19, 33, 37, 36, 3, 5; 271/9.06
See application file for complete search history.

(56) References Cited

U.S. PATENT DOCUMENTS

| | | | |
|---|---|---|---|
| 6,584,903 B2 | 7/2003 | Jacobs | |
| 7,413,175 B2 | 8/2008 | Levine et al. | |
| 7,758,036 B2 | 7/2010 | Levine et al. | |
| 7,847,968 B2* | 12/2010 | Abiko | 358/1.17 |
| 7,957,024 B2* | 6/2011 | Tokashiki | 358/1.18 |
| 8,040,537 B2 | 10/2011 | Smith | |
| 8,131,009 B2* | 3/2012 | Levine et al. | 382/100 |
| 8,438,476 B2* | 5/2013 | Uhlig et al. | 715/251 |
| 2006/0126119 A1 | 6/2006 | Morales et al. | |
| 2007/0122256 A1* | 5/2007 | Toyoizumi et al. | 412/37 |

(Continued)

OTHER PUBLICATIONS

U.S. Appl. No. 12/211,853, Bober, et al., Sep. 17, 2008.

(Continued)

*Primary Examiner* — Jonathan R Beckley
(74) *Attorney, Agent, or Firm* — Gibb & Riley, LLC

(57) ABSTRACT

The disclosed book production system and method allow a book block and flexible book cover for that book block to be printed in the same print job immediately prior to binding. Specifically, a user-selection indicates that a book print job contains both the book block and the cover. Raster image processing is performed to produce raster images based on all page descriptions in the print job. The raster images are sorted by size to identify first raster images for the book block pages and to identify at least one second raster image, which is more than twice as large as any of the first raster images, for the cover. The pages for the book block and the cover can be printed on first print media sheets and on a second larger print media sheet, respectively. Then, the cover can be bound to the book block by an in-line bookbinder.

20 Claims, 4 Drawing Sheets

(56) References Cited

U.S. PATENT DOCUMENTS

| | | |
|---|---|---|
| 2008/0049247 A1* | 2/2008 | Asai et al. .................... 358/1.15 |
| 2008/0138170 A1 | 6/2008 | Sturnick et al. |
| 2008/0174825 A1* | 7/2008 | Hatakeyama ................ 358/1.18 |
| 2009/0002726 A1 | 1/2009 | Osadciw |
| 2010/0182629 A1 | 7/2010 | Evan et al. |
| 2010/0195141 A1 | 8/2010 | Fan et al. |
| 2011/0157619 A1 | 6/2011 | Nelson et al. |
| 2011/0222106 A1 | 9/2011 | Grodsky et al. |

OTHER PUBLICATIONS

U.S. Appl. No. 12/331,768, Mandel, et al., Dec. 10, 2008.

* cited by examiner

BOOK PRODUCTION SYSTEM, METHOD AND PROGRAM STORAGE MEDIUM

BACKGROUND

The embodiments disclosed herein generally relate to book production and, more particularly, to a book production system and an associated method that allow a book block and flexible book cover for that book block to be printed in the same print job prior to binding.

Typically, for flexible books (e.g., paperback books), the flexible book cover is designed to wrap around three sides of an associated book block and, particularly, to cover the first page, the spine and the last page of the book block. Those skilled in the art will recognize that a book block refers to the stack of print media sheets, which are printed with text and/or images and which make up the pages of the book. During production, flexible book covers and book blocks are printed as discrete print jobs and then bound together by a bookbinder. Specifically, flexible book covers are pre-printed and loaded into a cover tray in the bookbinder. The pages of the book are then printed, fed into the bookbinder, stacked, and tamped to form a book block. Next, one of the pre-printed book covers is bound to the book block using, for example, a perfect bound book binding process or a tape book binding process. That is, in the bookbinder, adhesive material (e.g., glue or tape) is applied to the spine portion of the book block and/or to the corresponding center portion of a flexible book cover, the book cover is wrapped around the book block, and pressure and/or heat are applied to secure the book cover to the book block. Unfortunately, using pre-printed flexible book covers can result in miscount and/or mismatch problems. For example, the wrong number of flexible book covers can be pre-printed and/or the wrong pre-printed flexible book covers can be bound to the book blocks.

SUMMARY

In view of the foregoing, disclosed herein are embodiments of a book production system and an associated method that allow a book block and flexible book cover for that book block to be printed in the same print job immediately prior to binding in order to avoid miscount and/or mismatch problems. Specifically, in the embodiments, a user-selection can indicate that a print job for a book contains both the book block and the cover for the book block. Raster image processing can be performed to produce raster images based on all of the page descriptions contained in the print job and, then, the raster images can be sorted by size to identify first raster images for the pages of the book block and at least one second raster image for the cover (e.g., one second raster image for a simplex cover and two second raster images for a duplex cover). The second raster image(s) will be more than twice as large as any of the first raster images. Next, the pages for the book block can be printed by a print engine on first print media sheets and the cover can be printed by the same or a different print engine on a second print media sheet that is greater than twice as large as each first print media sheet. The cover can then be bound by an in-line bookbinder to the book block in order to form the book. The printing and binding processes can be iteratively repeated in order to form a specified number of copies of the book, as set forth in the print job.

More particularly, disclosed herein are embodiments of a book production system. Each of the embodiments of the book production system can comprise at least a controller, one or more print engines, and an in-line bookbinder.

The controller can receive a print job for a book and can also receive a user-selection, which specifically indicates that the print job comprises page descriptions for pages of a book block and for a cover for the book block. The controller can either receive additional user-selections specifying first print media sheets for the book block pages and a second print media sheet for the cover or, optionally, the user-selection can also contain a request for automatic print media sheet selection for the book block pages and for the cover.

The controller can comprise a raster image processor, a decomposer, a print scheduler and a print media sheet selector. Upon receipt of a print job request that comprises page descriptions for both the book block pages and the cover, the raster image processor can perform raster image processing to produce raster images corresponding to each of the page descriptions in the print job. Then, the decomposer can sort the raster images by size to distinguish between those corresponding to the book block pages and those corresponding to the cover. Specifically, the decomposer can sort the raster images by size to identify first raster images for the book block pages and at least one second raster image for the cover. It should be noted that a single second raster image, which is more than two times larger than any of the other raster images, can be identified by the decomposer as the raster image for a simplex cover (i.e., a cover printed on only one surface and, typically, an outer surface). Alternatively, a pair of second raster images, which are each more than two times larger than any of the other raster images, can be identified by the decomposer as the raster images for a duplex cover (i.e., a cover printed on both the inner and outer surfaces).

As mentioned above, the user-selection can, optionally, contain a request for automatic print media sheet selection for the book block pages and for the cover. In this case, the sheet selector can automatically select the first print media sheets to be used for the book block pages and the second media sheet to be used for the cover. Regardless of whether the print media sheets are specified by the user or automatically selected by the sheet selector, the second print media sheet selected for the cover should be greater than two times larger than each first print media sheet selected for the book block pages. Specifically, the second print media sheet should have a length that is at least twice the width of each first print media sheet plus the anticipated height of the stack of pages (i.e., the stack of first print media sheets) that will form the book block and a width that is approximately equal to the length of each first print media sheet.

The print engine(s), which are operatively controlled by the controller, can then print the book block pages on the first print media sheets based on the first raster images and the cover on the second print media sheet based on the second raster image(s).

Once printing is complete, the bookbinder (e.g., a perfect bound bookbinder, a tape bookbinder, etc.), which is also operatively controlled by the controller, can receive and stack the book block pages to form the book block, can receive the cover and can bind the cover to the book block to form a book.

It should be noted that the print scheduler should schedule printing, by the print engine(s), of the book block pages and the cover such that the book block pages and the cover are ultimately received in the required order by the bookbinder. It should further be noted that the print job received by the controller can designate a specified number of copies of the book to be produced and the controller can operatively control the print engine(s) and the bookbinder to iteratively repeat the above-described printing and binding processes in order to form the specified number of copies.

Also disclosed herein are embodiments of a book production method. Each of the embodiments of the book production method can comprise receiving a print job for a book and also receiving a user-selection, which specifically indicates that the print job comprises page descriptions for pages of a book block and for a cover for the book block. Additional user-selections can be received which specify first print media sheets for the book block pages and a second print media sheet for the cover. However, optionally, the user-selection can also contain a request for automatic print media sheet selection for the book block pages and for the cover.

Upon receipt of a print job request that comprises page descriptions for both the book block pages and the cover, raster image processing can be performed to produce raster images corresponding to each of the page descriptions in the print job. Then, the raster images can be sorted by size to distinguish between those corresponding to the book block pages and those corresponding to the cover. Specifically, the raster images can be sorted by size to identify first raster images for the book block pages and at least one second raster image for the cover. It should be noted that a single second raster image, which is more than two times larger than any of the other raster images, can be identified by the decomposer as the raster image for a simplex cover (i.e., a cover printed on only one surface and, typically, an outer surface). Alternatively, a pair of second raster images, which are each more than two times larger than any of the other raster images, can be identified by the decomposer as the raster images for a duplex cover (i.e., a cover printed on both the inner and outer surfaces).

As mentioned above, the user-selection can, optionally, contain a request for automatic print media sheet selection for the book block pages and for the cover. In this case, the first print media sheets to be used for the book block pages and the second media sheet to be used for the cover can be automatically selected. Regardless of whether the print media sheets are specified by the user or automatically selected, the second print media sheet selected for the cover should be greater than two times larger than each first print media sheet selected for the book block pages. Specifically, the second print media sheet should have a length that is at least twice the width of each first print media sheet plus the anticipated height of the stack of pages (i.e., the stack of first print media sheets) that will form the book block and a width that is approximately equal to the length of each first print media sheet.

Next, the book block pages can be printed on the first print media sheets based on the first raster images and the cover can be printed on the second print media sheet based on the second raster image(s). Once printing is complete, the book block pages can be stacked to form the book block and the cover can be bound (e.g., using perfect bound bookbinding techniques or tape bookbinding techniques) to the book block to form a book.

It should be noted that printing, by the print engine(s), of the book block pages and the cover should be scheduled such that the book block pages and the cover are ultimately received in the required order by the bookbinder. It should further be noted that the received print job can designate a specified number of copies of the book to be produced and the above-described printing and binding processes can be iteratively repeated in order to form the specified number of copies of the book, as set forth in the print job.

Also disclosed herein are embodiments of a computer-readable medium. This computer-readable medium can store instructions, which when executed by a computerized device, cause the above-described book production system to perform the above-described book production method.

BRIEF DESCRIPTION OF THE DRAWINGS

Various exemplary embodiments of the disclosed system and method are described in detail below, with reference to the attached figures, in which.

DETAILED DESCRIPTION

As mentioned above, typically, for flexible books (e.g., paperback books), the flexible book cover is designed to wrap around three sides of an associated book block and, particularly, to cover the first page, the spine and the last page of the book block. Those skilled in the art will recognize that a book block refers to the stack of print media sheets, which are printed with text and/or images and which make up the pages of the book. During production, flexible book covers and book blocks are printed as discrete print jobs and then bound together by a bookbinder. Specifically, flexible book covers are pre-printed and loaded into a cover tray in the bookbinder. The pages of the book are then printed, fed into the bookbinder, stacked, and tamped to form a book block. Next, one of the pre-printed book covers is bound to the book block using, for example, a perfect bound book binding process or a tape book binding process. That is, in the bookbinder, adhesive material (e.g., glue or tape) is applied to the spine portion of the book block and/or to the corresponding center portion of a flexible book cover, the book cover is wrapped around the book block, and pressure and/or heat are applied to secure the book cover to the book block. Unfortunately, using pre-printed flexible book covers can result in miscount and/or mismatch problems. For example, the wrong number of flexible book covers can be pre-printed and/or the wrong pre-printed flexible book covers can be bound to the book blocks.

In view of the foregoing, disclosed herein are embodiments of a book production system and an associated method that allow a book block and flexible book cover for that book block to be printed in the same print job immediately prior to binding in order to avoid miscount and/or mismatch problems. Specifically, in the embodiments, a user-selection can indicate that a print job for a book contains both the book block and the cover for the book block. Raster image processing can be performed to produce raster images based on all of the page descriptions contained in the print job and, then, the raster images can be sorted by size to identify first raster images for the pages of the book block and at least one second raster image for the cover (e.g., one second raster image for a simplex cover and two second raster images for a duplex cover). It should be noted that the second raster image(s) will be more than twice as large as any of the first raster images. Next, the pages for the book block can be printed by a print engine on first print media sheets and the cover can be printed by the same or a different print engine on a second print media sheet that is greater than twice as large as each first print media sheet. The cover can then be bound by an in-line bookbinder to the book block in order to form the book. The printing and binding processes can be iteratively repeated in order to form a specified number of copies of the book, as set forth in the print job.

Figure 1:
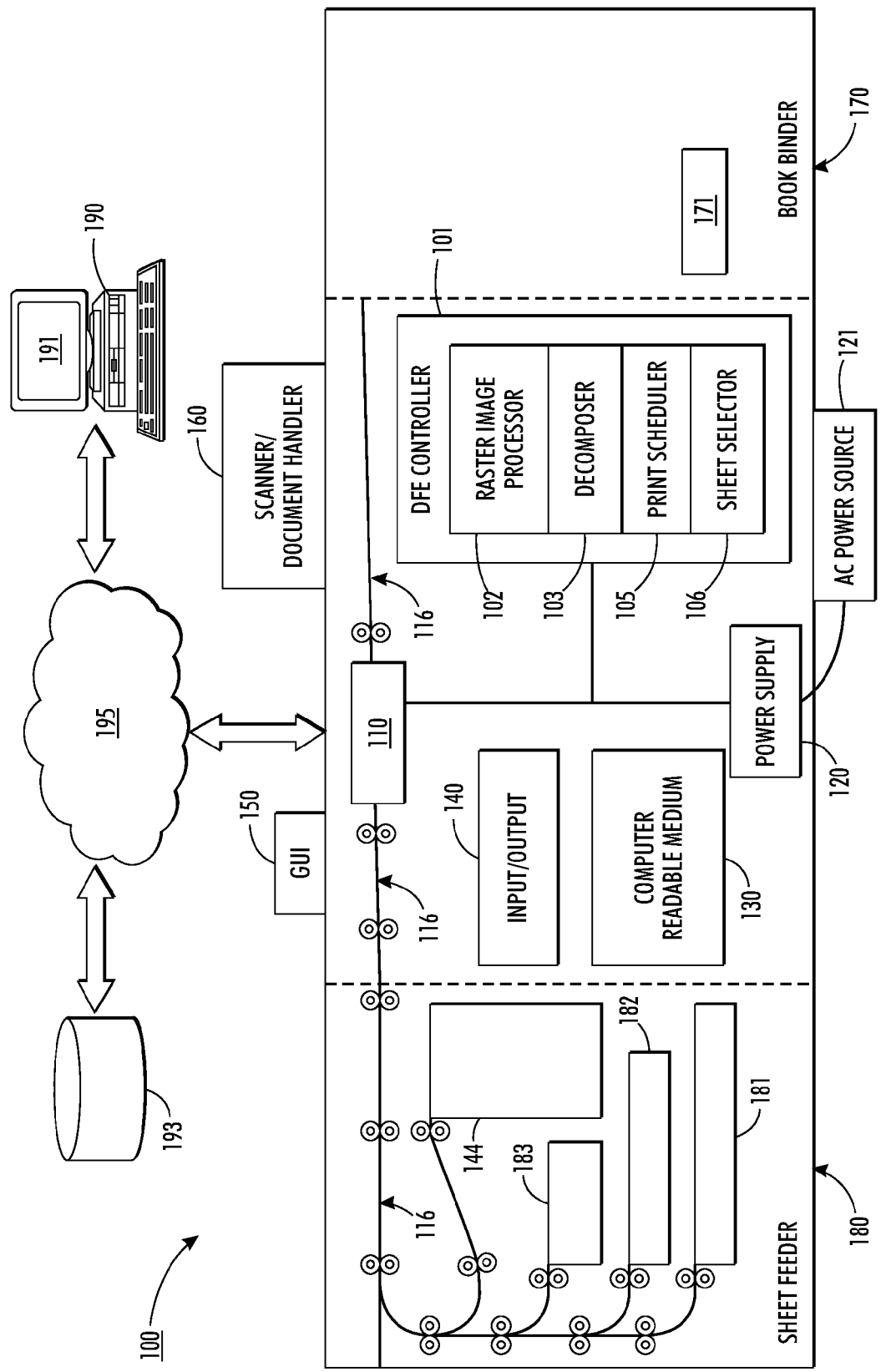
FIG. 1 is a schematic diagram of an embodiment of a book production system.

More particularly, referring to FIG. 1, disclosed herein are embodiments of a computerized book production system 100.

Generally, each of the embodiments of the book production system 100 can comprise at least a print media sheet transport path 116, a sheet feeder (i.e., a sheet supply) 180, one or more print engines 110 (i.e., marking devices), an in-line bookbinder 170 and a digital front end (DFE) controller 101 (i.e., a computerized device, such as a FreeFlow™ Print Server produced by Xerox Corporation of Norwalk, Conn., also referred to herein as a digital front end (DFE) processor or simply as a controller). The print media sheet transport path 116 can transport (i.e., can be adapted to transport, configured to transport, etc.) print media sheets from a selected tray (e.g., see print media sheet supply trays 181-184) in the sheet feeder 180 through one or more of the print engine(s) 110 for printing and into the bookbinder 170 for binding. The DFE controller 101 can operatively control (i.e., can be adapted to operatively control, can be configured to operatively control, can be programmed to control, etc.) the actions of the various functional components of the book production system 100 (e.g., the actions of the sheet transport path 116, the sheet feeder 180, the print engine(s) 110, and the bookbinder 170), as discussed in greater detail below.

It should be noted that the book production system and, particularly, the functional components thereof can operate on power supplied from a power supply 120, which connects to an external alternating current power source 121 and which converts the external power from the power source 121 into the type of power needed by the various components. Additionally, a communications port 140 (i.e., an input/output) can be operatively connected between the DFE controller 101 and a wired or wireless network 195 (e.g., a local area network (LAN), wide area network (WAN), internet, etc.) to allow for communications between the book production system 100 and other devices (e.g., an external computerized device 190 and/or an external data source 193). The book production system 100 can optionally comprise one or more accessory functional component, such as a scanner/document handler 160 and/or a local graphic user interface (GUI) 150, and these accessory functional components may similarly operate on power supplied from the external power source 121 (through the power supply 120).

The DFE controller 101 can comprise a raster image processor 102 and a print media sheet selector 106. The DFE controller 101 can receive a print job for a book and, particularly, for a book block for a book. Specifically, the print job can comprise page descriptions for the pages of a book block. It should be noted that for purposes of this disclosure the term "page description" refers to information about fonts, graphics, and the like that describe the appearance of each page in a print job. As discussed in detail in U.S. Patent Application Publication No. 2009/0002726 of Osadciw, filed on Jun. 26, 2007, assigned to Xerox Corporation of Norwalk, Conn., and incorporated herein by reference, each page description may, for example, be in a high-level page description language, such as PostScript (PS), Portable Document Format (PDF) and Extensible Markup Language (XML) Paper Specification (XPS).

Upon receipt of a print job, the raster image processor 102 can perform (i.e., can be adapted to perform, configured to perform, etc.) raster image processing to produce raster images corresponding to each of the page descriptions for the book block. It should be noted that for purposes of this disclosure the phrase "raster image processing" refers a process of translating each page description contained in the print job into a pixel-by-pixel rendering (i.e., a bitmap), which will be used by print engine(s) to mark each print media sheet accordingly. Raster image processors are well known in the art and, thus, the details of such processors are omitted from this specification so as to allow the reader to focus on the salient aspects of the embodiments.

Additionally, the sheet feeder 180 can comprise multiple print media sheet supply trays (e.g., see trays 181-184) that contain stacks of print media sheets. The print media sheets in the different trays 181-184 can be different types of print media sheets (e.g., can have different sizes, can have different weights, can comprise different materials, etc.). Multi-tray sheet feeders 180 are well known in the art and, thus, the details of such sheet feeders are omitted from this specification so as to allow the reader to focus on the salient aspects of the embodiments. The sheet selector 106 can cause (i.e., can be adapted to cause, can be configured to cause, can be programmed to cause, etc.) the sheet feeder 180 to supply print media sheets from a specific tray, which contains user-selected print media sheets, to the print media sheet transport path 116.

The print media sheet transport path 116 can transport (i.e., can be adapted to transport, can be configured to transport, etc.) the print media sheets through one or more of the print engine(s) 110 for printing based on the raster images (i.e., the bitmaps) produced by the raster image processor 102. The print engine(s) 110 can comprise, for example, single color (i.e., monochrome) and/or multi-color print engine(s) that can print (i.e., can be adapted to print, can be configured to print, etc.) in simplex format (i.e., on a single surface of a print media sheet) and/or duplex format (i.e., on opposing surfaces of a print media sheet). Print engine(s) and sheet transport paths are well known in the art and, thus, the details of such components are omitted from this specification in order to allow the reader to focus on the salient aspects of the embodiments.

Following printing, the print media sheet transport path 116 can further transport (i.e., can be adapted to transport, can be configured to transport, etc.) the print media sheets to the bookbinder 170 for binding. The bookbinder 170 (e.g., a perfect bound book binder or a tape book binder) can receive printed print media sheets and can stack and tamp (i.e., can be adapted to stack and tamp, can be configured to stack and tamp, etc.) those printed print media sheets in order to form a book block. The bookbinder 170 can also comprise a tray 171 for holding a stack of pre-printed flexible book covers and can bind (i.e., can be adapted to bind, can be configured to bind, etc.) one of these pre-printed flexible book covers to the book block. Bookbinders, such as perfect bound bookbinders or tape bookbinders, are well known in the art and, thus, the details of such bookbinders are omitted from this specification so as to allow the reader to focus on the salient aspects of the embodiments.

As discussed in greater detail below, the book production system 100 disclosed herein further provides the user with the option of printing the cover in the same print job as the book block immediately prior to binding (as opposed to using a pre-printed book cover, as discussed above) and with the additional option of allowing the print media sheets for both the book block pages and the cover to be automatically selected by the sheet selector 106 (as opposed to being user-specified, as discussed above).

Figure 2:
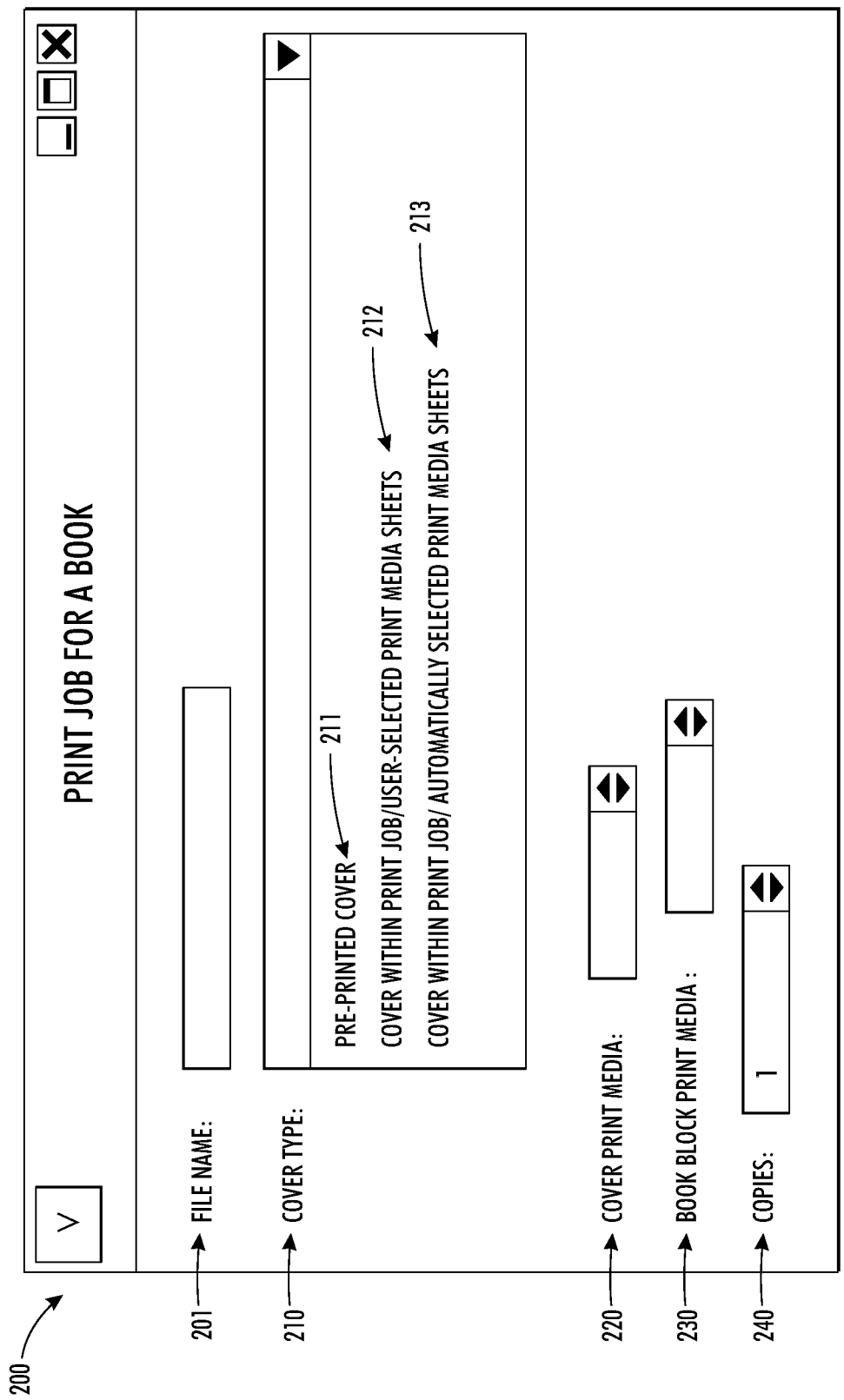
FIG. 2 is an drawing illustrating a screen shot of an exemplary graphic user interface submission form for a print job for a book.

More specifically, in each of the embodiments of the book production system 100 disclosed herein, the DFE controller 101 can receive (i.e., can be adapted to receive, can be configured to receive, etc.) a print job for a book. Specifically, a user can submit the print job for the book to the DFE controller 101 through a local graphical user interface 150 or, alternatively, through a graphical user interface (GUI) 191 of an external computerized device 190 (e.g., a desktop computer, a laptop computer, a tablet computer, a smart phone, etc.). FIG. 2 is a screen shot of an exemplary graphical user interface (GUI) print job submission form 200 for a book that can be used in conjunction with the embodiments disclosed herein. As shown, the print job submission form 200 can specify the name 201 of the data file to be used printed during book production, including the stored location of that data file (e.g., in a memory of the external computerized device 190 or in another external data source 193) and the DFE controller 101 can access that data file via the network 195.

In each of the embodiments of the book production system 100, the DFE controller 101 can further receive (i.e., can be adapted to receive, can be configured to receive, etc.) various user-selections (i.e., user-specifications, user-inputs, etc.) related to the print job through the print job submission form 200. For example, as shown in FIG. 2, the print job submission form 200 can further allow the user to select (i.e., to specify, to input, etc.) the number of copies of the book to be produced by the book production system 100 (see item number 240). Additionally, the print job submission form 200 can further contain a cover type drop down menu 210. This cover type drop down menu 210 can, for example, allow a user to select any one of several possible options with respect to the cover for the book.

A first option 211 on the cover type drop down menu 210 labeled, for example, "Pre-printed Cover", can specifically indicate that the received print job comprises page descriptions for pages of a book block, but not for a cover for the book block. Thus, book production can proceed, as described above, using a flexible book cover that was pre-printed and held for subsequent use in a pre-printed cover tray 171 within the bookbinder 170.

A second option 212 on the cover type drop down menu 210 labeled, for example, "Cover Within Print Job/User-Selected Print Media Sheets", can specifically indicate that the print job comprises page descriptions for pages of a book block and for a cover for that book block. As with the previously described first option 211, the raster image processor 102 can perform raster image processing (i.e., can be adapted to perform raster image processing, can be configured to perform raster image processing, can be programmed to perform raster image processing, etc.) to produce raster images corresponding to each of the page descriptions in the print job. That is, the raster image processor 102 can translate each page description contained in the print job into a pixel-by-pixel rendering (i.e., a bitmap) of the page.

Since, however, the cover is to be printed upon a larger print media sheet than the pages of the book block, the book production system 100 is able to differentiate between the raster images for the book block pages and the raster image(s) for the cover. Thus, in the embodiments of the book production system 100 disclosed herein, the DFE controller 101 can further comprise a data decomposer 103 (i.e., a data analyzer). This decomposer 103 can sort (i.e., can be adapted to sort, can be configured to sort, can be programmed to sort, etc.) the raster images by size in order to distinguish between those raster images corresponding to the book block pages and any raster images corresponding to the cover. Specifically, the decomposer 103 can sort the raster images by size to identify first raster images for the book block pages and at least one second raster image for the cover.

It should be noted that a single second raster image, which is more than two times larger than any of the other raster images, can be identified by the decomposer 103 as the raster image for a simplex cover (i.e., a cover printed on only one surface and, typically, an outer surface). Alternatively, a pair of second raster images, which are each more than two times larger than any of the other raster images, can be identified by the decomposer 103 as the raster images for a duplex cover (i.e., a cover printed on both the inner and outer surfaces). It should also be noted that, when the page description(s) for the cover are within the print job, the first and/or last page description in the print job will typically correspond to the cover. However, since this is not always the case, the above-described sorting process is provided.

Figure 3A:
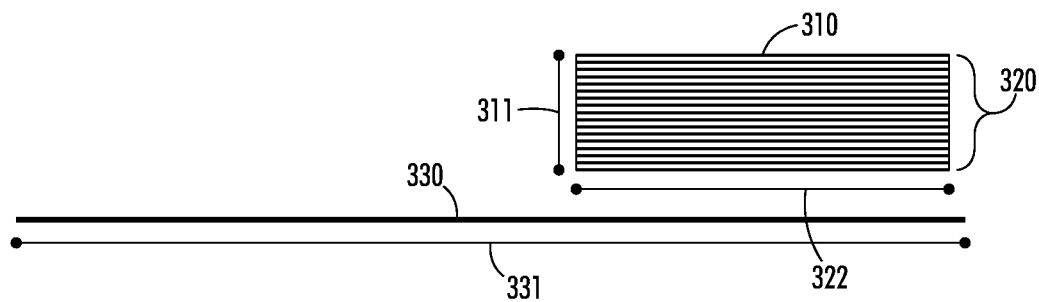
FIGS. 3A-3C are drawings illustrating the relative sizes of a flexible printed book cover and a book block to be covered by the flexible printed book cover.
Figure 3B:
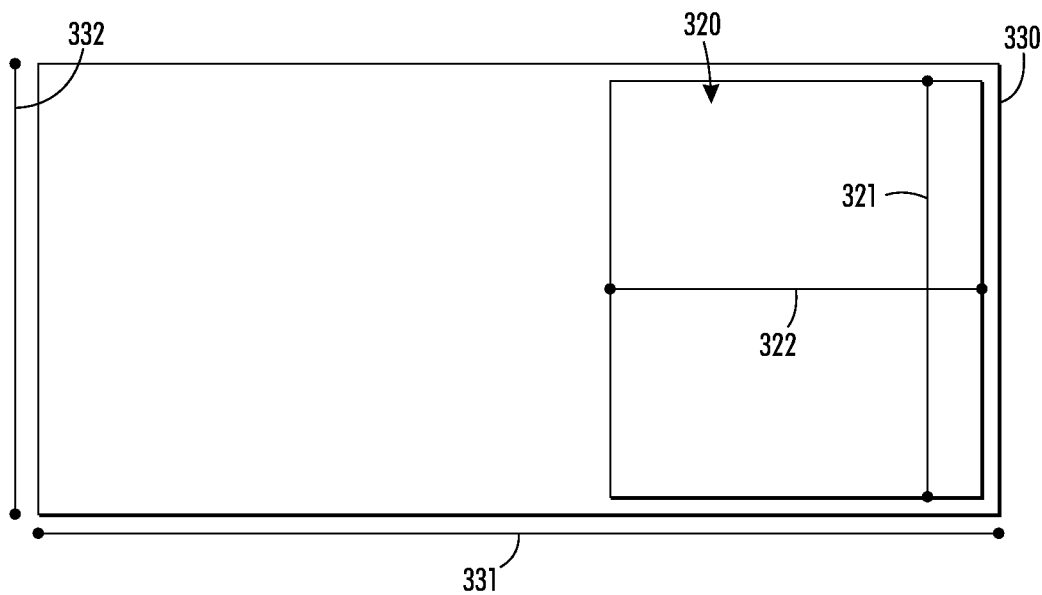
Figure 3C:
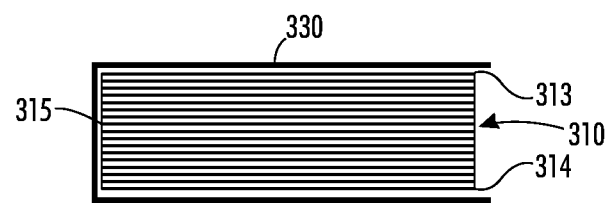

Additionally, it should be noted that when this second option 212 is selected, the print job submission form 200 further allows the user to select and/or customize the print media sheet sheets and, particularly, the sizes thereof, for the cover and for the pages of the book block (see items 220 and 230, respectively). That is, the user can select first print media sheets having a first size to be used for the book block pages and can further select a second print media sheet having a second size to be used for the cover. Typically, as illustrated in FIGS. 3A-B, the second print media sheet selected for the cover 330 should be a flexible print media sheet that comprises a flexible material suitable for use as a book cover. For example, the flexible material can comprise paper; however, alternatively, the flexible material can comprise any other suitable flexible material, such as cloth, plastic, a metallic foil, etc. In any case, this second print media sheet should be greater than two times larger than each first print media sheet selected for the pages 320 of the book block 310. For example, the second print media sheet selected for the cover 330 should have a length 331, which is at least twice the width 322 of each first print media sheet for the pages 320 of the book block 310 plus the anticipated height 311 of the book block 310 (i.e., of the stack of pages 320 that will form the book block 310), and should further have a width 332, which is approximately equal to or slightly greater than the height 321 of each first print media sheet so that, during binding, the cover 320 can be wrapped around three sides of the book block 310 and, particularly, can cover the first page 313, the spine 315 and the last page 314 of the book block 310 (as shown in FIG. 3C).

Then, referring again to FIG. 1, the sheet selector 106 can cause (i.e., can be adapted to cause, configured to cause, programmed to cause, etc.) the sheet feeder 180 to supply the first print media sheets from a first print media sheet supply tray (e.g., sheet tray 181), which contains the user-selected first print media sheets, to the print media sheet transport path 116. The print media sheet transport path 116 can transport (i.e., can be adapted to transport, can be configured to transport, etc.) the first print media sheets through one or more of the print engine(s) 110 for printing based on the first raster images (e.g., all pages of the book block can be printed by the same print engine; black text only pages can be printed by a monochrome print engine and color pages can be printed by a multi-color print engine, etc.). Then, the print media sheet transport path 116 can merge the first print media sheets, as necessary, and transport them on to the bookbinder 170. The bookbinder 170 can receive, stack, and tamp (i.e., can be adapted to receive, stack and tamp) the printed first print media sheets in order to form a book block.

Additionally, the sheet selector 106 can cause (i.e., can be adapted to cause, configured to cause, programmed to cause, etc.) the sheet feeder 180 to supply the second print media sheet from a second print media sheet supply tray (e.g., sheet tray 182), which contains the user-selected second print media sheets, to the print media sheet transport path 116. The print media sheet transport path 116 can transport (i.e., can be adapted to transport, can be configured to transport, etc.) the second print media sheet through one or more of the print engine(s) 110 for printing based on the second raster image(s) and then on to the bookbinder 170. It should be noted that simplex or duplex printing of the second print media sheet will depend upon the number of second raster images detected. A single second raster image identified by the decomposer 103 (i.e., one raster image greater than two times larger than all other raster images) will result in printing of a simplex cover, whereas two second raster images identified by the decomposer 103 (i.e., two raster images that are each greater than two times larger than all other raster images) will result in printing of a duplex cover. The bookbinder 170 can receive the printed second print media sheet (i.e., the simplex or duplex cover) and can bind (i.e., can be adapted to bind, configured to bind, etc.) the printed second print media sheet to the book block.

Since, however, the bookbinder 170 may have a required order for receipt of the book block and cover, the book production system 100 is able to ensure that the pages of the book block and the cover are printed in the required order. Thus, in the embodiments of the book production system 100 disclosed herein, the DFE controller 101 can further comprise a print scheduler 105. This print scheduler 105 can schedule (i.e., can be adapted to schedule, can be configured to schedule, can be programmed to schedule, etc.) printing, by the print engine(s) 310, of the book block pages and the cover such that the book block pages and the cover are ultimately received in the required order by the bookbinder 170. Specifically, if the bookbinder 170 requires that a cover be in position before receipt of the book block, then the print scheduler 105 can schedule printing on the second print media sheet for the cover first, followed by printing on the first print media sheets for the book block pages. Alternatively, if the bookbinder 170 requires that a book block be in position before moving a cover in place around the book block, the print scheduler 105 can schedule printing on the first print media sheets for the book block pages first, followed by printing on the second print media sheet for the cover.

Also, as mentioned above, the print job received by the DFE controller 101 can designate a specified number of copies of the book to be produced (see item number 240 of FIG. 2) and the DFE controller 101 and, particularly, the sheet selector 106 and print scheduler 105 can operatively control the sheet feeder 180, print engine(s) 310 and the bookbinder 170 to iteratively repeat the above-described functions in order to form the specified number of copies.

Further, a third option 213 on the cover selection drop down menu 210 labeled, for example, "Cover Within Print Job/Automatically Selected Print Media Sheets" can, like the second option 212 discussed above, specifically indicate that the print job comprises page descriptions for pages of a book block and for a cover for the book block. However, this third option 213 can also contain a request for automatic print media sheet selection for both the book block pages and for the cover. That is, this third option 213 allows the user to request automatic selection by the sheet selector 106 of first print media sheets having a first size to be used for the pages of the book block and a second print media sheet having a second size to be used for the cover.

Thus, in this case, the book production system 100 will operate in essentially the same manner as described above with respect to the second option 212; however, the sheet selector 106 can automatically select (i.e., can be adapted to automatically select, can be configured to automatically select, can be programmed to automatically select, etc.) the first and second print media sheets and cause the sheet feeder 106 to feed the automatically selected print media sheets to the print engine(s) 310. The first and second print media sheets and, particularly, the sizes of the print media sheets can, for example, be selected based on the respective raster image sizes. However, regardless of whether the print media sheets are user-selected or automatically selected by the sheet selector 106, as discussed above with regard to FIGS. 3A-3B, the second print media sheet selected for the cover 330 should be a flexible print media sheet that comprises a flexible material suitable for use as a book cover. For example, the flexible material can comprise paper; however, alternatively, the flexible material can comprise any other suitable flexible material, such as cloth, plastic, a metallic foil, etc. In any case, this second print media sheet should be greater than two times larger than each first print media sheet selected for the pages 320 of the book block 310. For example, the second print media sheet selected for the cover 330 should have a length 331, which is at least twice the width 322 of each first print media sheet for the pages 320 of the book block 310 plus the anticipated height 311 of the book block 310 (i.e., of the stack of pages 320 that will form the book block 310), and should further have a width 332, which is approximately equal to or slightly greater than the height 321 of each first print media sheet so that, during binding, the cover 330 can be wrapped around three sides of the book block 310 and, particularly, can cover the first page 313, the spine 315 and the last page 314 of the book block 310 (as shown in FIG. 3C).

Following selection of the first and second print media sheets, the sheet selector 106 can further determine whether or not the selected print media sheets are currently stored in the supply trays 181-184 of the sheet feeder 180. If not, the DFE controller 101 can, via a graphical user interface 191 or 150, prompt the user to load/re-load the appropriate print media sheets into the sheet feeder 180.

It should be noted that the drawings are offered for illustration purposes and are not intended to be limiting. For example, with regard to the book production system 100 of FIG. 1, the various components (e.g., the sheet feeder 180, print engines 110, and bookbinder 170) are illustrated as being contained within a single unit. However, alternatively, the book production system 100 can comprise a modular book production system, wherein the sheet feeder 180, print engine(s) 110 and bookbinder 170 are contained in separate modules (i.e., separate units), each controlled by the DFE controller 101. Modular printing systems are well known in the art (e.g., see U.S. patent application Ser. No. 12/211,853 of Bober et al., filed on Sep. 17, 2008, and U.S. patent application Ser. No. 12/331,768 of Mandel et al., filed on Dec. 10, 2008, both of which are assigned to Xerox Corporation of Norwalk, Conn., USA, and incorporated herein by reference) and, thus, the details of such modular systems are omitted from this specification in order to allow the reader to focus on the salient aspects of the embodiments. Additionally, with regard to the print job submission form 200 of FIG. 2, the labeling of the user-selections may vary from that shown. Furthermore, instead of being presented to the user on a single screen, as shown, the print job submission form 200 may, alternatively, be presented to a user as a series of screens. For example, the user may first be presented with a first screen showing the cover selection drop down menu 210 and, if the first or second options 211 or 212, respectively, are selected the user may be presented with a second screen allowing for print media selection 220, 230 and so on.

Figure 4:
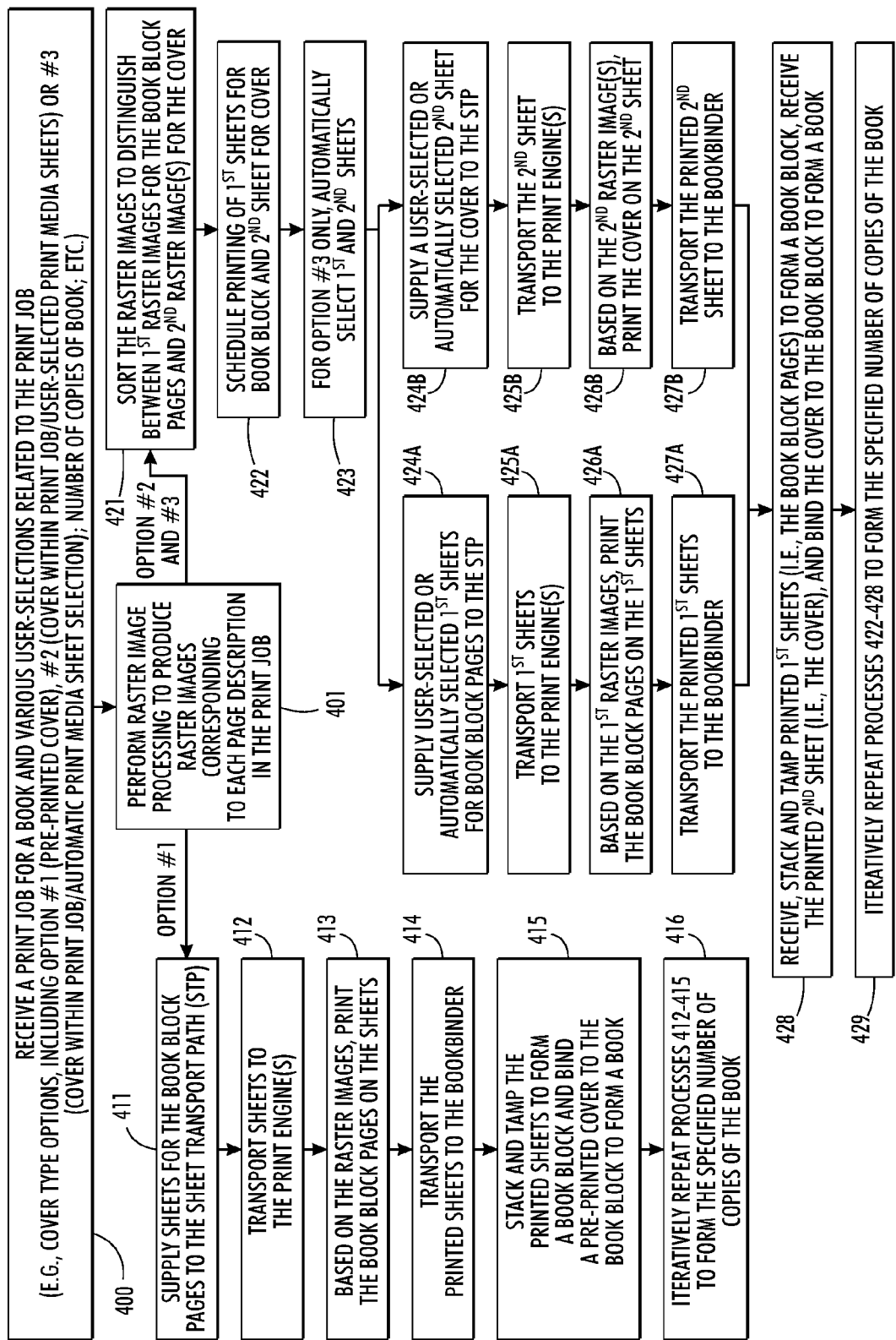
FIG. 4 is a flow diagram illustrating an embodiment of a book production method.

Referring to FIG. 4 in combination with FIG. 1, also disclosed herein are embodiments of a book production method. Each of the embodiments of the book production method can comprise receiving (e.g., by a DFE controller 101 of a book production system 100) a print job for a book, including various user-selections related to that print job (400).

Specifically, the book production method can comprise receiving (e.g., by the DFE controller 101) a print job submission form from a user via a local graphical user interface 150 or, alternatively, via a graphical user interface (GUI) 191 of an external computerized device 190 (e.g., a desktop computer, a laptop computer, a tablet computer, a smart phone, etc.).

FIG. 2 is a screen shot of an exemplary graphical user interface (GUI) print job submission form 200 for a book that can be used in conjunction with the embodiments disclosed herein. As shown, the print job submission form 200 can specify the name 201 of the data file to be printed during book production, including the stored location of that data file (e.g., in a memory of the external computerized device 190 or in another external data source 193) for subsequent access (e.g., by the DFE controller 101 via the network 195). The print job submission form 200 can further allow for submission of various user-selections (i.e., user-specifications, user-inputs, etc.) related to the print job. For example, as shown in FIG. 2, the print job submission form 200 can allow the user to select (i.e., to specify, to input, etc.) the number of copies of the book to be produced by the book production system 100 (see item number 240). Additionally, the print job submission form 200 can contain a cover type drop down menu 202. This cover type drop down menu 210 can, for example, allow a user to select any one of several possible options (e.g., a first option 211, a second option 212 or a third option 213) with respect to the cover for the book.

The first option 211 on the cover type drop down menu 210 labeled, for example, "Pre-printed Cover", can specifically indicate that the received print job comprises page descriptions for pages of a book block, but not for a cover for the book block. When the first option 211 is selected by a user and received (e.g., by the DFE controller 101) the book production method can proceed, as follows.

Raster image processing can be performed (e.g., by a raster image processor 102 of the DFE controller 101) to produce raster images corresponding to each of the page descriptions for the book block (401). Then, print media sheets can be supplied to a print media sheet transport path 116 (e.g., by a sheet feeder 180, which is operatively controlled by a sheet selector 106 of the DFE controller 101) (411). The print media sheets can then be transported to one or more of print engine(s) 110 (e.g., by the print media sheet transport path 116, which is operatively controlled by the DFE controller 101) (412). Next, based on the raster images produced at process step 401, the pages of the book block can be printed on the print media sheets (e.g., by the print engine(s) 110, which are operatively controlled by the DFE controller 101) (413). Following printing, the print media sheets can be transported (e.g., by the print media sheet transport path 116) to a bookbinder 170 (e.g., a perfect bound bookbinder or tape bookbinder) (414), where the pages of the book block are stacked and tamped in order to form the book block and where a pre-printed flexible book is bound to the book block (e.g., using perfect bound bookbinding or tape bookbinding techniques) (415). In this case, the pre-printed flexible book covers can be stored for subsequent use within a tray 171 within the bookbinder 170. The above-described process steps 411-415 can then be iteratively repeated in order to form the specified number of copies of the book, as set forth in the print job submission at process step 400 (416).

The second and third options 212-213 on the cover type drop down menu 210 labeled, for example, "Cover Within Print Job/User-Selected Print Media Sheets" and "Cover Within Print Job/Automatically Selected Print Media Sheets", respectively, can specifically indicate that the print job comprises page descriptions for pages of a book block and for a cover for that book block. When the second or third option 212, 213 is selected by a user and received (e.g., by the DFE controller 101) the book production method can proceed, as follows.

As with first option 212, raster image processing can be performed (e.g., by a raster image processor 102 of the DFE controller 101) to produce raster images corresponding to each of the page descriptions in the print job (401). That is, each page description contained in the print job, which in this case contains page descriptions for both the pages of the book block and for the cover, can be translated into a pixel-by-pixel rendering (i.e., a bitmap) of the page.

Since, however, the cover is to be printed upon a larger print media sheet than the pages of the book block, the book production method is able to differentiate between the raster images for the book block pages and any raster images for the cover. Thus, when the second or third option 212, 213 is selected, the raster images generated at process 401 are sorted by size (e.g., by a data decomposer 103 of the DFE controller 101) in order to distinguish between those raster images corresponding to the book block pages and the raster image(s) corresponding to the cover (421). Specifically, at process step 421, the raster images are sorted by size to identify first raster images for the book block pages and at least one second raster image for the cover. It should be noted that a single second raster image, which is more than two times larger than any of the other raster images, can be identified by the decomposer 103 as the raster image for a simplex cover (i.e., a cover printed on only one surface and, typically, an outer surface). Alternatively, a pair of second raster images, which are each more than two times larger than any of the other raster images, can be identified by the decomposer 103 as the raster images for a duplex cover (i.e., a cover printed on both the inner and outer surfaces). It should also be noted that, when page description(s) for the cover are within the print job, the first and/or last page description in the print job will typically correspond to the cover. However, since this is not always the case, the above-described sorting process is provided.

Additionally, when the second option 212 is selected, the print job submission form 200 can further allow a user to select and/or customize the print media sheet sizes for the cover and for the pages of the book block (see items 220 and 230, respectively). That is, the user can select first print media sheets having a first size to be used for the book block pages and can further select a second print media sheet having a second size to be used for the cover. However, when the third option 213 is selected, the first print media sheets having a first size to be used for the book block pages and a second print media sheet having a second size to be used for the cover will be automatically selected (e.g., by the sheet selector 106 of the DFE controller 101) (423). It should be noted that, regardless of whether the print media sheets are user-selected and received within the print job submission at process step 400 or automatically selected at process step 423, the second print media sheet selected for the cover should be a flexible print media sheet that comprises a flexible material suitable for use as a book cover. For example, the flexible material can comprise paper; however, alternatively, the flexible material can comprise any other suitable flexible material, such as cloth, plastic, a metallic foil, etc. Additionally, this second print media sheet should be greater than two times larger than each first print media sheet selected for the pages of the book block. For example, as illustrated in FIGS. 3A-3B, the second print media sheet selected for the cover 330 should have a length 331, which is at least twice the width 322 of each first print media sheet for the pages 320 of the book block 310 plus the anticipated height 311 of the book block 310 (i.e., of the stack of pages 320 that will form the book block 310), and should further have a width 332, which is approximately equal to or slightly greater than the height 321 of each first print media sheet so that, during binding, the cover 320 can be wrapped around three sides of the book block 310 and, particularly, can cover the first page 313, the spine 315 and the last page 314 of the book block 310 (as shown in FIG. 3C).

Following automatic selection of the print media sheets at process 423, a determination can be made (e.g., by the sheet selector 106) whether or not the selected first and second print media sheets are currently stored in the supply trays 181-184 of a sheet feeder 180. If no such sheets are stored, the user can be prompted (e.g., by the DFE controller 101 via a graphical user interface 191 or 150) to load/re-load the appropriate print media sheets into the sheet feeder 180.

Subsequently, first print media sheets can be supplied to a print media sheet transport path 116 (e.g., from a first print media sheet supply tray 181 by the sheet feeder 180, which is operatively controlled by a sheet selector 106 of the DFE controller 101) (424a). The first print media sheets can then be transported to one or more of print engine(s) 110 (e.g., by the print media sheet transport path 116, which is operatively controlled by the DFE controller 101) (425a). Then, based on the first raster images identified at process step 421, the pages of the book block can be printed on the first print media sheets (e.g., by the print engine(s) 110, which are operatively controlled by the DFE controller 101) (426a). For example, all pages of the book block can be printed by the same print engine or, alternatively, black text only pages can be printed by a monochrome print engine and color pages can be printed by a multi-color print engine. Following printing, the first print media sheets can be merged, as necessary, and transported (e.g., by the print media sheet transport path 116) to the bookbinder 170 (e.g., a perfect bound bookbinder or tape bookbinder) (427a), where the first print media sheets (i.e., the pages of the book block) are stacked and tamped in order to form a book block.

Additionally, the second print media sheet can be supplied to the print media sheet transport path 116 (e.g., from a second print media sheet supply tray 182 by the sheet feeder 180) (424b). The second print media sheet can then be transported to one or more of print engine(s) 110 (e.g., by the print media sheet transport path 116) (425b) and, based on the second raster image(s) identified at process step 421, the cover can be printed on the second print media sheet (e.g., by the print engine(s) 110) (426b). It should be noted that a single second raster image identified at process 421 (i.e., one raster image greater than two times larger than all other raster images) will result in printing of a simplex cover, whereas two second raster images identified by at process 421 (i.e., two raster images that are each greater than two times larger than all other raster images) will result in printing of a duplex cover. Following printing, the second print media sheet (i.e., the simplex or duplex cover) can be transported (e.g., by the print media sheet transport path 116) to the bookbinder 170 (427b), Next, the second print media sheet (i.e., the simplex or duplex cover) can be bound to the book block (e.g., by the bookbinder 170, using perfect bound bookbinding or tape bookbinding techniques) (428).

It should be noted that the bookbinder 170 may have a required order for receipt of the book block and cover. Thus, when the second or third option 212, 213 is selected, printing of the book block pages and the cover is scheduled (e.g., by a print scheduler 105 of the DFE controller 101) such that the book block pages and the cover are ultimately received in the required order by the bookbinder 170 at process 428 (422). Specifically, if the bookbinder 170 requires that a cover be in position before receipt of the book block, then printing on the second print media sheet for the cover and, particularly, process steps 424b, 425b, 426b, and 427b can be scheduled first, followed by printing on the first print media sheets for the book block pages (i.e., followed by process steps 424a, 425a, 426a, and 427a). Alternatively, if the bookbinder 170 requires that a book block be in position before moving a cover in place around the book block, printing on the first print media sheets for the book block pages and, particularly, process steps 424a, 425a, 426a, and 427a can be scheduled first, followed by printing on the second print media sheet for the cover (i.e., followed by process steps 424b, 425b, 426b, and 427b).

The above-described process steps 422-428 can then be iteratively repeated in order to form the specified number of copies of the book, as set forth in the print job submission at process step 400 (429).

Also disclosed herein are embodiments of a computer readable medium. Specifically, as will be appreciated by one skilled in the art aspects of the present disclosure may take the form of a computer readable medium (e.g., a computer program product). Any combination of one or more computer readable medium(s) may be utilized. The computer readable medium may be a non-transitory computer readable storage device, such as an electronic, magnetic, optical, electromagnetic, infrared, or semiconductor system, apparatus, or device, or any suitable combination of the foregoing). Exemplary non-transitory computer readable storage devices include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a non-transitory computer readable storage device may be any tangible medium that can contain, or store a program for use by or in connection with an instruction execution system, apparatus, or device. Alternatively, the computer readable medium can comprise a computer readable signal medium (e.g., a propagated data signal with computer readable program code embodied therein, for example, in baseband or as part of a carrier wave).

In any case, referring to FIG. 1, this computer readable medium 130 can be incorporated into the book production system 100, can be readable by the DFE controller 101 (i.e., by a computer or computerized device) and can tangibly embody (i.e., store) sets of instructions (i.e., programs). These instructions can be executed by the DFE controller 101 (or by the various components of the DFE controller 101, for example, by the raster image processor 102, the decomposer 103, the print scheduler 105, the sheet selector 106, etc.) in order to perform the book production method, as described in detail above and illustrated in FIG. 4 and, particularly, to cause the book production system 100 to produce books, as discussed in detail above.

It should be noted that many computerized devices are discussed above. Computerized devices that include chipbased central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted from this specification in order to allow the reader to focus on the salient aspects of the embodiments. Similarly, scanners and other similar peripheral equipment are available from Xerox Corporation, Norwalk, Conn., USA and the details of such devices are not discussed herein for purposes of brevity and reader focus. It should further be noted that all of the foregoing embodiments are specifically applicable to electrostatographic and/or xerographic machines and/or processes.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein should not be implied or imported from any above example as limitations to any particular order, number, position, size, shape, angle, color, or material.

Therefore, disclosed above are embodiments of a book production system and an associated method that allow a book block and flexible book cover for that book block to be printed in the same print job immediately prior to binding in order to avoid miscount and/or mismatch problems. Specifically, in the embodiments, a user-selection can indicate that a print job for a book contains both the book block and the cover for the book block. Raster image processing can be performed to produce raster images based on all of the page descriptions contained in the print job and, then, the raster images can be sorted by size to identify first raster images for the pages of the book block and to identify at least one second raster image, which is more than twice as large as any of the first raster images, for the cover (e.g., one second raster image for a simplex cover and two second raster images for a duplex cover). Next, the pages for the book block can be printed by a print engine on first print media sheets and the cover can be printed by the same or a different print engine on a second print media sheet that is greater than twice as large as each first print media sheet. The cover can then be bound by an in-line bookbinder to the book block in order to form the book. The printing and binding processes can be iteratively repeated in order to form a specified number of copies of the book, as set forth in the print job.

What is claimed is:

1. A book production system comprising:
   a graphical user interface displaying a print job submission form for a print job for a book, said print job submission form providing a menu for selection, by a user, of one of a plurality of cover type options, said cover type options comprising:
      a first cover type option indicating a pre-printed cover;
      a second cover type option indicating that said print job contains page descriptions for pages of a book block and for a cover for said book block and further indicating user-selection of print media sheets for said pages; and,
      a third cover type option indicating that said print job contains said page descriptions for said pages of said book block and for said cover for said book block and further indicating a request for automatic system-selection of said print media sheets for said pages;
   a controller in communication with said graphical user interface and receiving said print job for said book from said user using said print job submission form on said graphical user interface, said controller comprising:
      a raster image processor performing raster image processing to produce raster images corresponding to each of said page descriptions; and
      a decomposer sorting said raster images corresponding to each of said page descriptions by size when said print job submission form indicates user-selection of one of said second cover type option and said third cover type option on said menu, said decomposer further identifying, based on said size, first raster images for said pages of said book block and at least one second raster image for said cover, said at least one second raster image for said cover being identified due to being larger than any of said first raster images and said sorting of said raster images and said identifying of said first raster images and said at least one second raster image being performed because, within said print job, said cover may correspond to any of said page descriptions;
   at least one print engine operatively controlled by said controller, said at least one print engine printing said pages of said book block based on said first raster images and said cover based on said at least one second raster image, said pages being printed on first print media sheets and said cover being printed on a second print media sheet that is larger than said first print media sheets; and
   a bookbinder operatively controlled by said controller, said bookbinder receiving said pages of said book block from said at least one print engine, stacking said pages to form said book block, receiving said cover from said at least one print engine, and binding said cover to said book block to form said book.

2. The book production system of claim 1, said at least one second raster image comprising only one of the following:
   a single second raster image for a simplex cover; and
   a pair of second raster images for a duplex cover, each second raster image being greater than twice as large as any first raster image.

3. The book production system of claim 1, said controller further comprising a print scheduler scheduling said printing of said pages of said book block and said cover so that said pages of said book block and said cover are received in a required order by said bookbinder.

4. The book production system of claim 1, said print job designating a specified number of copies of said book and said at least one print engine and said bookbinder iteratively repeating said printing and said binding, respectively, to form said specified number of said copies.

5. The book production system of claim 1, said controller further receiving, with said second option, additional user-selections specifying said first print media sheets for said pages of said book block and said second print media sheet for said cover, said second print media sheet being greater than two times larger than each first print media sheet.

6. The book production system of claim 1, said bookbinder comprising any one of a perfect bound bookbinder and a tape bookbinder.

7. A book production system comprising:
a graphical user interface displaying a print job submission form for a print job for a book, said print job submission form providing a menu for selection, by a user, of one of a plurality of cover type options, said cover type options comprising:
  a first cover type option indicating a pre-printed cover;
  a second cover type option indicating that said print job contains page descriptions for pages of a book block and for a cover for said book block and further indicating user-selection of print media sheets for said pages; and,
  a third cover type option indicating that said print job contains said page descriptions for said pages of said book block and for said cover for said book block and further indicating a request for automatic system-selection of said print media sheets for said pages;
a controller in communication with said graphical user interface and receiving said print job for said book from said user using said print job submission form on said graphical user interface, said controller comprising:
  a raster image processor performing raster image processing to produce raster images corresponding to each of said page descriptions;
  a decomposer sorting said raster images corresponding to each of said page descriptions by size when said print job submission form indicates user-selection of said third cover type option on said menu, said decomposer further identifying, based on said size, first raster images for said pages of said book block and at least one second raster image for said cover, said at least one second raster image for said cover being identified due to being greater than two times larger than any of said first raster images and said sorting of said raster images and said identifying of said first raster images and said at least one second raster image being performed because, within said print job, said cover may correspond to any of said page descriptions;
  a print media sheet selector automatically selecting first print media sheets for said pages of said book block and a second print media sheet for said cover based on sizes of said first raster images and said at least one second raster image, respectively, when said print job submission for indicates said user-selection of said third cover type option on said menu, said automatically selecting being performed such that said second print media sheet is greater than two times larger than each first print media sheet;
at least one print engine operatively controlled by said controller, said at least one print engine printing said pages of said book block based on said first raster images and said cover based on said at least one second raster image, said pages of said book block being printed on said first print media sheets and said cover being printed on said second print media sheet; and
a bookbinder operatively controlled by said controller, said bookbinder receiving said pages of said book block from said at least one print engine, stacking said pages to form said book block, receiving said cover from said at least one print engine, and binding said cover to said book block to form said book.

8. The book production system of claim 7, said at least one second raster image comprising only one of the following:
a single second raster image for a simplex cover; and
a pair of second raster images for a duplex cover.

9. The book production system of claim 7, said controller further comprising a print scheduler scheduling said printing of said pages of said book block and said cover so that said pages of said book block and said cover are received in a required order by said bookbinder.

10. The book production system of claim 7, said print job designating a specified number of copies of said book and said at least one print engine and said bookbinder iteratively repeating said printing and said binding, respectively, to form said specified number of said copies.

11. The book production system of claim 7, said bookbinder comprising any one of a perfect bound bookbinder and a tape bookbinder.

12. A book production method comprising:
receiving a print job for a book from a user using a print job submission form on a graphical user interface, said print job submission form providing a menu for selection, by a user, of one of a plurality of cover type options, said cover type options comprising:
  a first cover type option indicating a pre-printed cover;
  a second cover type option indicating that said print job contains page descriptions for pages of a book block and for a cover for said book block and further indicating user-selection of print media sheets for said pages; and,
  a third cover type option indicating that said print job contains said page descriptions for said pages of said book block and for said cover for said book block and further indicating a request for automatic system-selection of said print media sheets for said pages;
performing raster image processing to produce raster images corresponding to each of said page descriptions;
when said print job submission form indicates user-selection of one of said second cover type option and said third cover type option on said menu, sorting said raster images corresponding to each of said page descriptions by size and further identifying, based on said size, first raster images for said pages of said book block and at least one second raster image for said cover, said at least one second raster image for said cover being identified due to being larger than any of said first raster images and said sorting of said raster images being performed because, within said print job, said cover may correspond to any of said page descriptions;
printing said pages of said book block based on said first raster images and said cover based on said at least one second raster image, said pages being printed on first print media sheets and said cover being printed on a second print media sheet that is larger than said first print media sheets;
stacking said pages to form said book block; and
binding said cover to said book block to form said book.

13. The book production method of claim 12, said at least one second raster image comprising only one of the following:
a single second raster image for a simplex cover; and
a pair of second raster images for a duplex cover, each second raster image being greater than twice as large as any first raster image.

14. The book production method of claim 12, further comprising scheduling said printing of said pages of said book block and said cover so that said pages of said book block and said cover are received in a required order for said binding.

15. The book production method of claim 12, said print job designating a specified number of copies of said book and said method further comprising iteratively repeating said printing and said binding to form said specified number of said copies.

16. The book production method of claim 12, further comprising receiving, with said second option, additional user-selections specifying said first print media sheets for said pages of said book block and said second print media sheet for said cover, said second print media sheet being greater than two times larger than each first print media sheet.

17. The book production method of claim 12, said user-selection further requesting automatic print media sheet selection and said method further comprising automatically selecting said first print media sheets for said pages of said book block and said second print media sheet for said cover, said second print media sheet being greater than two times larger than each first print media sheet.

18. The book production method of claim 12, said binding being performed using a bookbinder comprising any one of a perfect bound bookbinder and a tape bookbinder.

19. A non-transitory storage medium readable by a computerized device, said non-transitory storage medium storing instructions executed by said computerized device to perform a book production method, said book production method comprising:
    receiving a print job for a book from a user using a print job submission form on a graphical user interface, said print job submission form providing a menu for selection, by a user, of one of a plurality of cover type options, said cover type options comprising:
        a first cover type option indicating a pre-printed cover;
        a second cover type option indicating that said print job contains page descriptions for pages of a book block and for a cover for said book block and further indicating user-selection of print media sheets for said pages; and,
        a third cover type option indicating that said print job contains said page descriptions for said pages of said book block and for said cover for said book block and further indicating a request for automatic system-selection of said print media sheets for said pages;
    performing raster image processing to produce raster images corresponding to each of said page descriptions;
    when said print job submission form indicates user-selection of one of said second cover type option and said third cover type option on said menu, sorting said raster images corresponding to each of said pages descriptions by size and identifying, based on said size, first raster images for said pages of said book block and at least one second raster image for said cover, said at least one second raster image for said cover being identified due to being larger than any of said first raster images and said sorting of said raster images being performed because, within said print job, said cover may correspond to any of said page descriptions;
    printing said pages of said book block based on said first raster images and said cover based on said at least one second raster image, said pages being printed on first print media sheets and said cover being printed on a second print media sheet that is larger than said first print media sheets;
    stacking said pages to form said book block; and
    binding said cover to said book block to form said book.

20. The storage medium of claim 19, said at least one second raster image comprising only one of the following:
    a single second raster image for a simplex cover; and
    a pair of second raster images for a duplex cover, each second raster image being greater than twice as large as any first raster image.

* * * * *